United States Patent
Bergman

(10) Patent No.: US 11,274,859 B2
(45) Date of Patent: Mar. 15, 2022

(54) ACTIVE DAYTIME RADIATIVE COOLING FOR AIR CONDITIONING AND REFRIGERATION SYSTEMS

(71) Applicant: University of Kansas, Lawrence, KS (US)

(72) Inventor: Theodore L. Bergman, Lawrence, KS (US)

(73) Assignee: UNIVERSITY OF KANSAS, Lawrence, KS (US)

( * ) Notice: Subject to any disclaimer, the term of this patent is extended or adjusted under 35 U.S.C. 154(b) by 15 days.

(21) Appl. No.: 16/768,171

(22) PCT Filed: Dec. 10, 2018

(86) PCT No.: PCT/US2018/064680
§ 371 (c)(1),
(2) Date: May 29, 2020

(87) PCT Pub. No.: WO2019/118322
PCT Pub. Date: Jun. 20, 2019

(65) Prior Publication Data
US 2020/0292214 A1    Sep. 17, 2020

Related U.S. Application Data

(60) Provisional application No. 62/723,255, filed on Aug. 27, 2018, provisional application No. 62/597,034, filed on Dec. 11, 2017.

(51) Int. Cl.
*F25B 21/04*    (2006.01)

(52) U.S. Cl.
CPC .................................. *F25B 21/04* (2013.01)

(58) Field of Classification Search
CPC ........ F25B 21/04; F25B 23/00; F25B 27/002; F25B 23/003; F25B 21/02; F24S 70/225
See application file for complete search history.

(56) References Cited

U.S. PATENT DOCUMENTS

| | | | |
|---|---|---|---|
| 9,709,349 B2 | 7/2017 | Raman et al. | |
| 2010/0155043 A1* | 6/2010 | Smith | C09K 5/14 165/185 |

(Continued)

FOREIGN PATENT DOCUMENTS

| | | | |
|---|---|---|---|
| GB | 2566602 A | * | 7/2017 |
| WO | 2008/154692 A1 | | 12/2008 |

(Continued)

OTHER PUBLICATIONS

Bao, Hua, et al. "Double-layer nanoparticle-based coatings for efficient terrestrial radiative cooling." Solar Energy Materials and Solar Cells 168 (2017): 78-84.

(Continued)

*Primary Examiner* — Elizabeth J Martin
(74) *Attorney, Agent, or Firm* — Thomas | Horstemeyer, LLP.; Jason M. Perilla

(57) ABSTRACT

Examples of heat exchanger systems for active radiative cooling are described. In one example, the system includes a heat exchanger and a spectrally selective surface material on at least one surface of the heat exchanger. The spectrally selective surface material exhibits high reflectivity at shorter wavelengths and high emissivity at longer wavelengths. The system can also include an active cooling system in some cases to actively transfer heat to the heat exchanger. The use of spectrally selective surfaces that operate at temperatures exceeding that of the outdoor ambient for which convective losses augment radiation losses have advantages over passive cooling, such as but not limited to: providing a better match to cooling loads, reducing the heat rejection surface area required to achieve a desired cooling rate, and increasing the heat transferred to deep space through the atmospheric window so as to simultaneously cool infrastructure, devices, buildings, and Earth.

20 Claims, 14 Drawing Sheets

(56) References Cited

U.S. PATENT DOCUMENTS

| | | | |
|---|---|---|---|
| 2011/0209744 A1* | 9/2011 | Hu | H01L 35/26 136/248 |
| 2014/0131023 A1 | 5/2014 | Raman et al. | |
| 2015/0338175 A1 | 11/2015 | Raman et al. | |
| 2017/0248381 A1 | 8/2017 | Yang et al. | |
| 2018/0342979 A1* | 11/2018 | Joardar | H02S 40/30 |

FOREIGN PATENT DOCUMENTS

| | | |
|---|---|---|
| WO | 2016/205717 A1 | 12/2016 |
| WO | 2017/151514 A1 | 9/2017 |
| WO | 2019/118322 A1 | 6/2019 |

OTHER PUBLICATIONS

Chen, Zhen, et al. "Radiative cooling to deep sub-freezing temperatures through a 24-h day-night cycle." Nature communications 7.1 (2016): 1-5.

Chu, Steven, Yi Cui, and Nian Liu. "The path towards sustainable energy." Nature materials 16.1 (2017): 16-22.

Fernandez, Nicholas, et al. Energy savings potential of radiative cooling technologies. No. PNNL-24904. Pacific Northwest National Lab.(PNNL), Richland, WA (United States), 2015.

Granqvist, C. G.; et al. "Radiative cooling to low temperatures: General considerations and application to selectively emitting SiO films." Journal of Applied Physics 52.6 (1981): 4205-4220.

Huang, Zhifeng; et al. "Nanoparticle embedded double-layer coating for daytime radiative cooling." International Journal of Heat and Mass Transfer 104 (2017): 890-896.

Kecebas, Muhammed Ali, et al. "Passive radiative cooling design with broadband optical thin-film filters." Journal of Quantitative Spectroscopy and Radiative Transfer 198 (2017): 179-186.

Lu, Xing, et al. "Cooling potential and applications prospects of passive radiative cooling in buildings: The current state-of-the-art." Renewable and Sustainable Energy Reviews 65 (2016): 1079-1097.

Nilsson, Torbjörn MJ; et al. "Radiative cooling during the day: simulations and experiments on pigmented polyethylene cover foils." Solar energy materials and solar cells 37.1 (1995): 93-118.

Raman, Aaswath P., et al. "Passive radiative cooling below ambient air temperature under direct sunlight." Nature 515.7528 (2014): 540-544.

Vall, Sergi; et al. "Radiative cooling as low-grade energy source: A literature review." Renewable and Sustainable Energy Reviews 77 (2017): 803-820.

Vincent Wong, Kaufui. "Anthropogenic heat generation and heat exhaust to the ultimate sink." Journal of Energy Resources Technology 139.3 (2017).

Zhai, Yao, et al. "Scalable-manufactured randomized glass-polymer hybrid metamaterial for daytime radiative cooling." Science 355.6329 (2017): 1062-1066.

Zhai, Yao, et al. "Supplementary Material for Scalable-manufactured randomized glass-polymer hybrid metamaterial for daytime radiative cooling." Science 355.6329 (2017): 1062-1066.

Mandal, Jyotirmoy, et al. "Hierarchically porous polymer coatings for highly efficient passive daytime radiative cooling." Science 362.6412 (2018): 315-319.

Bergman, Theodore L. "Active daytime radiative cooling using spectrally selective surfaces for air conditioning and refrigeration systems." Solar Energy 174 (2018): 16-23.

International Search Report for PCT/US2018/064680 dated Mar. 4, 2019.

* cited by examiner

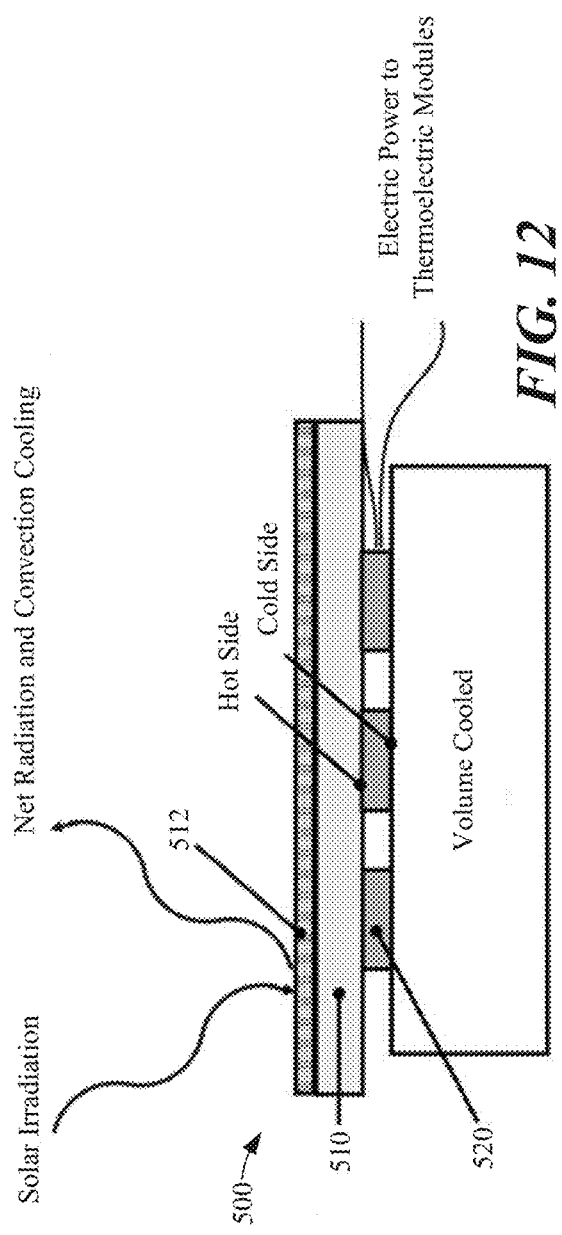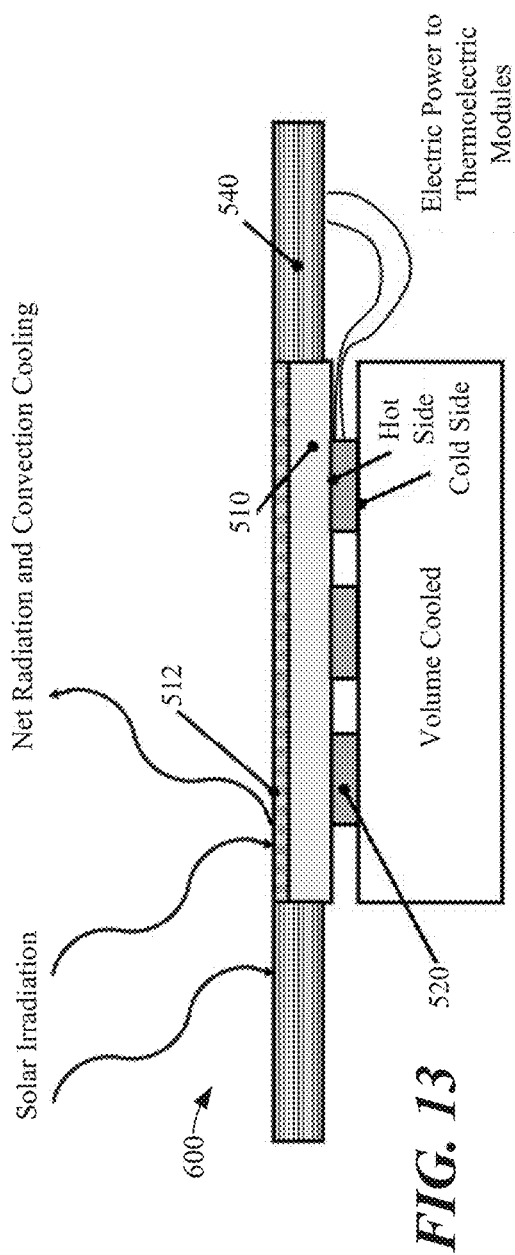

ACTIVE DAYTIME RADIATIVE COOLING FOR AIR CONDITIONING AND REFRIGERATION SYSTEMS

CROSS-REFERENCE TO RELATED APPLICATIONS

This application claims the benefit of U.S. Provisional Application No. 62/597,034, filed Dec. 11, 2017, and U.S. Provisional Application No. 62/723,255, filed Aug. 27, 2018, the entire contents of both of which applications are hereby incorporated herein by reference.

BACKGROUND

Surfaces that exhibit high reflectivity at short (e.g., solar) wavelengths and high emissivity at long (e.g., terrestrial) wavelengths can experience net radiation cooling, even when subjected to high levels of direct solar irradiation. There has been interest in developing materials for such surfaces that exhibit sharp spectral variations of emissivity, absorptivity, and reflectivity, so as to simultaneously inhibit absorption of short wavelength solar irradiation and promote long wavelength surface emission. Achieving these types of desired spectral properties can allow for passive daytime radiative cooling (PDRC) of surfaces, even when the surfaces are exposed to direct solar irradiation. In addition to contributing to daytime radiation heat losses, surface emission at wavelengths corresponding to the atmospheric window (i.e., $\sim 8 \mu m \leq \gamma \leq 13 \mu m$) is desirable because terrestrial (e.g., low source temperature) radiation in this wavelength range is relatively unaffected by absorption and scattering as it propagates upward through the atmosphere to deep space.

SUMMARY

Various aspects of a heat exchanger system are described. The system operates at a temperature that exceeds that of outdoor ambient for active radiative and convective cooling. In one example, the system includes a heat exchanger, a spectrally selective surface material on at least one surface of the heat exchanger, and an active cooling system to actively transfer heat from a space to be air conditioned or refrigerated to the heat exchanger. The spectrally selective surface material exhibits high reflectivity at shorter wavelengths and high emissivity at longer wavelengths.

In one case, the heat exchanger is installed at a location to expose the spectrally selective surface material on at least one surface of the heat exchanger to the temperatures of deep space. The heat exchanger can also be installed to expose the spectrally selective surface material to solar irradiation.

The active cooling system can be embodied as a vapor compression or other thermodynamic air conditioning or refrigeration unit. Hot refrigerant from the active cooling system can be cooled or condensed within the heat exchanger. In various cases, the heat exchanger can be embodied as a heat sink, a tube, a bank of tubes, or similar structures. The active cooling system can be powered off the commercial power grid. In some cases, the active cooling system can include one or more photovoltaic panels to provide power to the active cooling system.

In another example, the active cooling system can include one or more thermoelectric modules. In that case, a hot side of the thermoelectric module can be positioned to contact the heat exchanger. Variations and modifications to the examples presented above are described in further detail below, and other variations can be made without departing substantially from the spirit and principles of the disclosure.

BRIEF DESCRIPTION OF THE DRAWINGS

Many aspects of the present disclosure can be better understood with reference to the following drawings. The components in the drawings are not necessarily drawn to scale, with emphasis instead being placed upon clearly illustrating the principles of the disclosure. In the drawings, like reference numerals designate corresponding parts throughout the several views.

FIG. 12 illustrates an example system with heat exchanger having a spectrally selective surface integrated with thermoelectric cooling devices according to various embodiments described herein.

FIG. 13 illustrates an example system with heat exchanger having a spectrally selective surface integrated with thermoelectric cooling devices and photovoltaic panels according to various embodiments described herein.

DETAILED DESCRIPTION

Figure 1A:
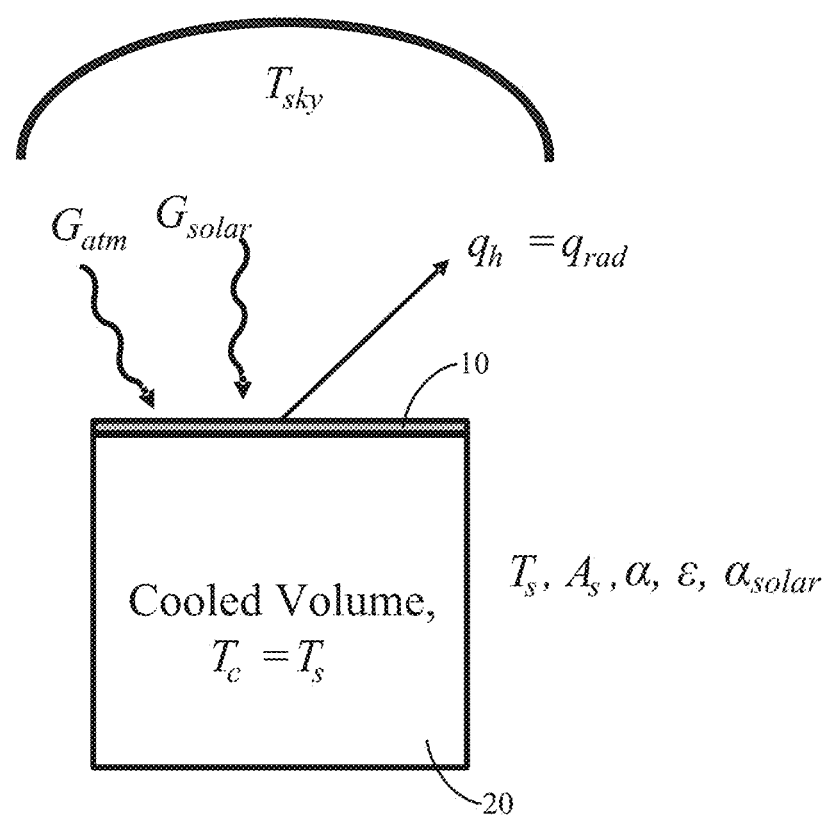
FIG. 1A illustrates an example passive cooling scenario using a spectrally selective surface according to various embodiments described herein.

As noted above, surfaces that exhibit high reflectivity at short (e.g., solar) wavelengths and high emissivity at long (e.g., terrestrial) wavelengths can experience net radiation cooling, even when subjected to high levels of direct solar irradiation. Spectral selective surfaces can be used for passive daytime radiative cooling (PDRC), even when the surfaces are exposed to direct solar irradiation. In addition to contributing to daytime radiation heat losses, surface emission at wavelengths corresponding to the atmospheric window e., ~8 µm≤γ≤13 µm) is desirable because terrestrial (e.g., low source temperature)radiation in this wavelength range is relatively unaffected by absorption and scattering as it propagates upward through the atmosphere to deep space.

In the context of spectrally selective surfaces, a radiation model is described below to quantify passive cooling rates provided by such surfaces. Because the temperature of the selective surfaces is below that of the outdoor ambient during passive operation, the selective surfaces must be thermally insulated from convective heating by the warm outdoor ambient. The model is then extended to predict the performance of a photovoltaic-powered, active cooling system where a hot selective surface is used to reject heat from the active cooling system, such as an air conditioning, refrigeration, or other active cooling system, by radiation and convection, In contrast to passive operation, the selective surface temperature during active cooling exceeds that of the outdoor ambient, and radiation heat losses from the selective surface are augmented by convective cooling to the outdoor ambient.

The use of spectrally selective surfaces with active cooling has advantages over passive cooling, such as: (1) providing a better match to cooling loads, (2) reducing the heat rejection surface area required to achieve a desired cooling rate, and (3) increasing the heat transferred to deep space through the atmospheric window so as to simultaneously cool infrastructure, devices, buildings, and Earth. Active daytime radiative cooling also has advantages over traditional air conditioning approaches, such as: (1) potentially eliminating the need for condenser units and the associated fan for cooling of such units, (2) providing for quiet operation, (3) reducing ambient temperatures and heat loads on the infrastructure being cooled, and (4) increasing the heat transferred from Earth to deep space. Widespread use of spectrally selective surfaces characterized by low solar absorptivity and high emissivity at terrestrial temperatures can help provide a pathway to energy sustainability and could reduce global temperatures.

In an experimental demonstration of the reduction of the temperature of a surface exposed to direct sunlight using a photoing radiative surface, a reduction of approximately 5° C. relative to the outdoor ambient was achieved during passive cooling. In another experimental demonstration of passive cooling, temperature reductions in excess of 40° C. were achieved relative to the outdoor ambient temperature while the surface was exposed to peak solar irradiation. The large reduction was accomplished by insulating the surface to minimize conduction and convection heat exchange with the environment. In still another demonstration, the temperature decrease of a small volume of liquid water was measured to be 8° C. below that of the outdoor ambient temperature, by placing a spectrally selective film above the water layer and exposing the filled container to direct solar irradiation. The film was a polymer-glass bead composite backed with a highly reflective metal layer reported to be amenable to low-cost, high-volume production, and other materials designed to provide passive temperature reduction of surfaces exposed to solar irradiation have been proposed.

Because of their ability to achieve sub-ambient temperatures when exposed to direct solar irradiation and low manufacturing cost, spectrally selective surfaces and films could be used for passive daytime refrigeration and cooling of automobiles, buildings, and other structures and devices. The spectrally selective surfaces and films can be used to reduce interior temperatures to sub-ambient values approaching those of the adjoining spectrally selective surfaces and films.

Surfaces designed for PDRC achieve their highest cooling rates ($q_c$) when their temperatures are relatively high. Low surface temperatures can be achieved only when such a PDRC surface is insulated from, for example, the volume or material to be cooled ($q_c \rightarrow 0$). Hence, the thermal behavior of PDRC surfaces (deteriorating cooling rates, $q_c$, at lower temperatures) runs counter to the demands of nearly all air conditioning and refrigeration applications for which the highest cooling loads, $q_c$, correspond to the lowest room or refrigeration temperatures. Therefore, the notion that passive refrigeration or air conditioning might be widely achieved with PDRC surfaces is in need of closer attention.

As shown herein, spectrally selective surfaces previously proposed for PDRC can be more effectively deployed as hot (relative to the outdoor ambient temperature) heat rejection surfaces used in conjunction with established refrigeration and air conditioning concepts in order to both match actual cooling load variations with temperature and increase heat rejection from the Earth through the atmospheric window relative to the PDRC refrigeration concepts.

As described herein, spectrally selective surfaces that exhibit high reflectivity at short (e.g., solar) wavelengths, and high emissivity at long (e.g., terrestrial temperature) wavelengths can be used for various cooling scenarios. In that context, FIG. 1A illustrates a.n example passive cooling scenario using a spectrally selective surface, where the selective surface temperature is below that of the outdoor ambient and must therefore be insulated from convective heat gain from the warm outdoor ambient, In FIG. 1A, a spectrally selective surface 10 of a cooled volume 20 is shown. In FIG. 1A, $T_{sky}$ is the temperature (K) of the sky, $G_{atm}$, is the irradiation (W/m²) of the selective surface from the atmosphere, and $G_{solar}$ is solar irradiation onto the selective surface. Additionally, $q_h$ is the rate of rejected heat (W), and $q_{rad}$ radiation heat (W). As is the area (m²) of the spectrally selective surface 10, $\alpha$ is the absorptivity of the spectrally selective surface 10, $\varepsilon$ is the emissivity of the spectrally selective surface 10, and as $\alpha_{solar}$ is the solar absorptivity of the spectrally selective surface 10. In this passive cooling scenario, $T_s$ is the temperature of the spectrally selective surface 10, $T_c$, is the temperature of the cooled volume 20, and $T_s$, is equal to $T_c$. Also, the rejected heat rate $q_h$ is the same as the radiation heat rate $q_{rad}$.

Figure 1B:
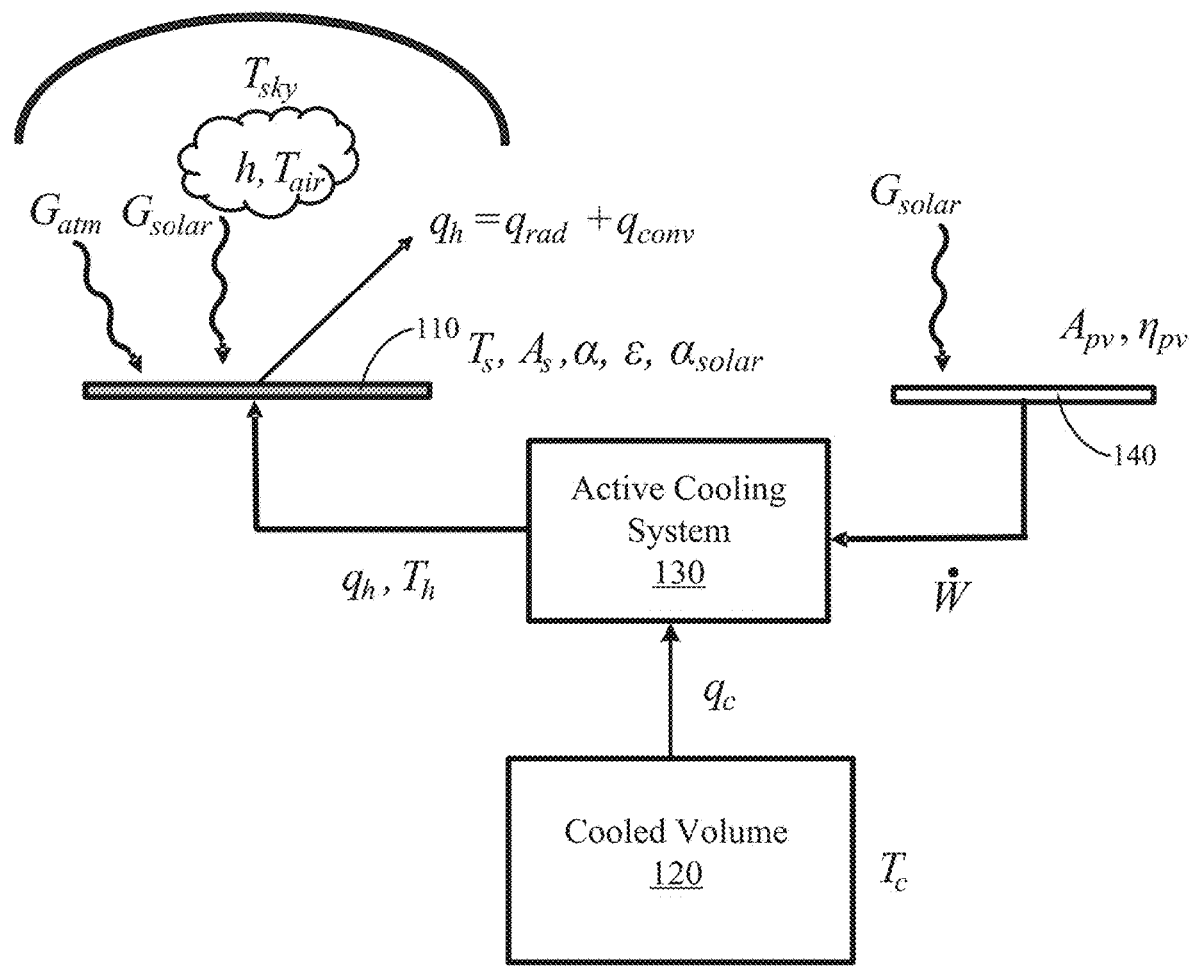
FIG. 1B illustrates a.n example active cooling scenario using a spectrally selective surface according to various embodiments described herein.

FIG. 1B illustrates an example active cooling scenario using a spectrally selective surface for which the temperature of the selective surface exceeds that of the ambient outdoor temperature, and radiation cooling of the hot selective surface is augmented by convective cooling of the same. The active cooling scenario in FIG. 113 includes a spectrally selective surface 110, a cooled volume 120, an active cooling system 130, and a photovoltaic panel 140. The active cooling system 130 can be embodied as a vapor compression refrigeration system or unit, a vapor absorption refrigeration system or unit, a gas cycle refrigeration system or unit, a thermoelectric cooler, or another active cooling system.

In addition to the variables shown in FIG. 1A, $T_{air}$, is the temperature of the air, h is the convection heat transfer coefficient (W/m$^2$K), and $q_{conv}$ is the convection heat rate (W). $A_{pv}$ is the area of the photovoltaic panel 140, and $\eta_{pv}$, is the efficiency of the photovoltaic conversion process of the photovoltaic panel 140. Additionally, $G^{atm}$ is the irradiation (W/m$^2$) of the selective surface from the atmosphere, $G^{solar}$ is solar irradiation. As compared to FIG. 1A, the rate of rejected heat $q^h$ in FIG. 1B now includes both the radiation heat rate $g_{rad}$ as well as the convection heat rate $q_{conv}$. The definitions of the variables shown in FIGS. 1A and 1B, and others described herein, are also provided in the APPENDIX of U.S. Provisional Application No. 62/597,034, filed Dec. 11, 2017.

Instead of daytime operation with $T_s<T_{air}$ as shown in FIG. 1A, the spectrally selective surface 110 (which may be the same as the spectrally selective surface 110 in FIG. 1A) is used to reject heat from the active cooling system 130 as shown in FIG. 1B according to an active daytime radiative cooling (ADRC) scenario. Since $T_s>T_{air}$ in FIG. 1B, heat is lost from the spectrally selective surface 110 by both radiation (grad) and convection ($q_{conv}$), with convection serving to improve the radiation-only system performance. The beneficial role of the convection in ARRC is in contrast to its role in PDRC (i.e., as in FIG. 1A), where convection heating of the spectrally selective surface 110 is undesirable. The performance of hot versus cold selective surfaces for purposes of heat rejection in a general air conditioning or refrigeration application including quantification of thermal radiation transferred from Earth through the atmospheric window, is predicted below with a system-level model.

To facilitate a comparison to PDRC operation as shown schematically in FIG. 1A, the active cooling system 130 in FIG. 1B is powered by way of the photovoltaic panel 140 based on solar irradiation. Alternatively, the ADRC system in FIG. 1B could be powered by electric sources other than photovoltaic panels, such as through electric utility grids. Regardless of the source of electric power, the active cooling system 130 is characterized by its coefficient of performance (COP) with, for example, lower COP values associated with thermoelectric coolers, and higher COPs affiliated with vapor compression cycles.

Radiation Sub-model. A spectrally selective surface similar o those proposed for PDRC is assumed for the analysis of the concepts shown in both FIGS. 1A and 1B, with radiative properties that exhibit sharp spectral variation and are directionally independent. As one example, the spectrally selective surface 110 can be characterized by $\varepsilon_{\lambda,1}=0$ at short wavelengths ($\lambda \leq 2.5$ μm) including the solar spectral range (0.3 μm$\leq\lambda\leq$2.5 μm), and $\varepsilon_{\lambda,2}=1$ at long wavelengths ($\lambda>2.5$ μm) including the atmospheric window (8 μm$\leq\lambda\leq$13 μm). Hence, the total emissivity of the spectrally selective surface 110, at temperature $T_s$, is:

$$\varepsilon(T_s) = \frac{\int_0^\infty \varepsilon_\lambda(\lambda, T_s) E_{\lambda,b}(\lambda, T_s) d\lambda}{E_b(T_s)} = \frac{\int_0^{2.5\mu m} \varepsilon_{\lambda,1} E_{\lambda,b}(\lambda, T_s) d\lambda}{E_b(T_s)} + \frac{\int_{2.5\mu m}^\infty \varepsilon_{\lambda,2} E_{\lambda,b}(\lambda, T_s) d\lambda}{E_b(T_s)}. \tag{1}$$

For generality, the time- and location-dependence of solar irradiation is not considered, and the spectral distribution of the solar irradiation is assumed to be proportional to that of a blackbody at $T_{solar}=5800$ K. Since directional effects are neglected, Kirchhoff's law may be applied and the solar absorptivity is approximated as:

$$\alpha(T_{solar}) = \frac{\int_0^\infty \varepsilon_\lambda(\lambda, T_{solar}) E_{\lambda,b}(\lambda, T_{solar}) d\lambda}{E_b(T_{solar})} = \frac{\int_0^{2.5\mu m} \varepsilon_{\lambda,1} E_{\lambda,b}(\lambda, T_{solar}) d\lambda}{E_b(T_{solar})} + \frac{\int_{2.5\mu m}^\infty \varepsilon_{\lambda,2} E_{\lambda,b}(\lambda, T_{solar}) d\lambda}{E_b(T_{solar})}. \tag{2}$$

The right-hand sides of Eqs. (1) and (2) can be evaluated using a band fraction calculation based upon the Planck blackbody distribution.

Irradiation of the spectrally selective surface 110 due to atmospheric emission can be described through the use of an effective sky temperature model, $G_{atm}=\sigma T_{sky}^4$. Since $T_{sky} \approx T_s$, the absorptivity of the spectrally selective surface 110 to atmospheric irradiation can be assumed to be equal to the emissivity of the spectrally selective surface 110, allowing the net radiation flux between the spectrally selective surface 110 and the atmosphere to be written as:

$$q''_{rad} = \varepsilon\sigma(T_s^4 - T_{sky}^4) \tag{3}$$

Predicted surface radiation fluxes using Eq. (3) can be compared to benchmark predictions, such as those provided by Huang and Ruan (Z. Huang and X. Ruan, "Nanoparticle embedded double-layer coating for daytime radiative cooling," *International Journal of Heat and Mass Transfer*, vol. 104, pp. 890-896, 2017). The detailed model of Huang and Ruan accounts for the directional nature of the atmospheric irradiation and the highly variable spectral distribution of the solar irradiation after it has propagated through a humid atmosphere. Good quantitative agreement between the predictions of the detailed model of Huang and Ruan and those using Eq. (3) has been observed over a broad range of surface temperatures.

Energy Balances and Rate Equations. The system model utilizes steady-state energy balances and heat transfer rate equations applied to the solar-irradiated, spectrally selective surface 110, the active cooling system 130, and the solar-irradiated photovoltaic panel 140 shown in FIG. 1B.

Both the spectrally selective surface 110 and the photovoltaic panel 140 can be assumed to be oriented horizontally. Neglecting conduction to or from the spectrally selective surface 110 of area $A_s$, heat rejected by the active cooling system 130 shown in FIG. 1B, $q_h$, can be expressed as:

$$q_h = A_s[\varepsilon\sigma(T_s^4 - T_{sky}^4) = h(T_s - T_{air}) - \alpha_{solar} G_{solar}], \tag{4}$$

where the convection heat transfer coefficient h is calculated using standard correlations described below. An energy balance on the active cooling system 130 yields:

$$q_h = q_c \dot{W}, \tag{5}$$

where $q_c$ is the rate at which thermal energy is extracted from the air-conditioned space (the cooling rate) and $\dot{W}$ is the rate of work required by the active cooling system 130 described by its COP:

$$COP = \frac{q_c}{\dot{W}} \tag{6}$$

Finally, the energy balance on the photovoltaic panel 140 of surface area $A_{pv}$, can be written as:

$$\dot{W} = A_{pv}\eta_{pv}G_{solar}, \tag{7}$$

where $\eta_{pv}$ is the efficiency of the photovoltaic conversion process. Equations (1) through (7), along with expressions used to quantify the convection heat transfer coefficient, can be solved to determine the relationships between $G_{solar}$, $T_{sky}$, h, COP, $\eta_{pv}$, $A_s$, $T_s$, $q_h$, $q_c$ and $A_{pv}$.

To demonstrate and compare the passive ($T_s < T_{air}$) and active ($T_s > T_{air}$) daytime radiative cooling concepts of FIGS. 1A and 1B, base case conditions of $G_{solar}$=900 W/m² (normal to the surface), $T_{sky}$=255 K and $T_{air}$=310 K are specified. The spectrally selective surface 110 is assumed to be horizontal and square in shape with a surface area of $A_s$=10 m². As noted above, convection heat transfer between the spectrally selective surface 110 and the ambient air adversely affects cooling performance during PDRC, but enhances performance when the selective surface is hot relative to the ambient outdoor air (as in the case for ADRC). To predict the maximum possible PDRC performance and, therefore, demonstrate the advantages of ADRC over PDRC, it will be assumed in the following base case calculations that: (i) convection heat transfer is somehow entirely eliminated during PDRC, and (ii) the ambient air is quiescent during ADRC so that only free convection occurs on the top side of the selective surface shown in FIG. 1B. The value of h during ADRC is determined with the expression:

$$Nu_{L,N} = 0.15 Ra_L^{1/3}, \tag{8}$$

where $L = A_s/P$. Air properties are evaluated at $T = (T_s + T_{air})/2$. Wind-induced forced convection will likely occur during ADRC and should increase heat transfer coefficients beyond those calculated using Eq. (8). Additionally, convective heating of the spectrally surface 110 cannot be entirely eliminated during PDRC. Thus, the base case treatment of convection effects leads to predicted thermal performances that deliberately (i) underestimate the actual performance of the proposed ADRC concept, and (ii) overestimate the actual performance of the existing PDRC concept. Also, for $q_h = q_c = 0$ W, the equilibrium temperature of the spectrally selective surface 110 under direct solar irradiation is $T_s$=262.7 K while that of any gray surface is $T_s$=376.4 K. Hence, gray surfaces do not perform well for either PDRC or ADRC and are not considered further.

Figures 2A, 2B:
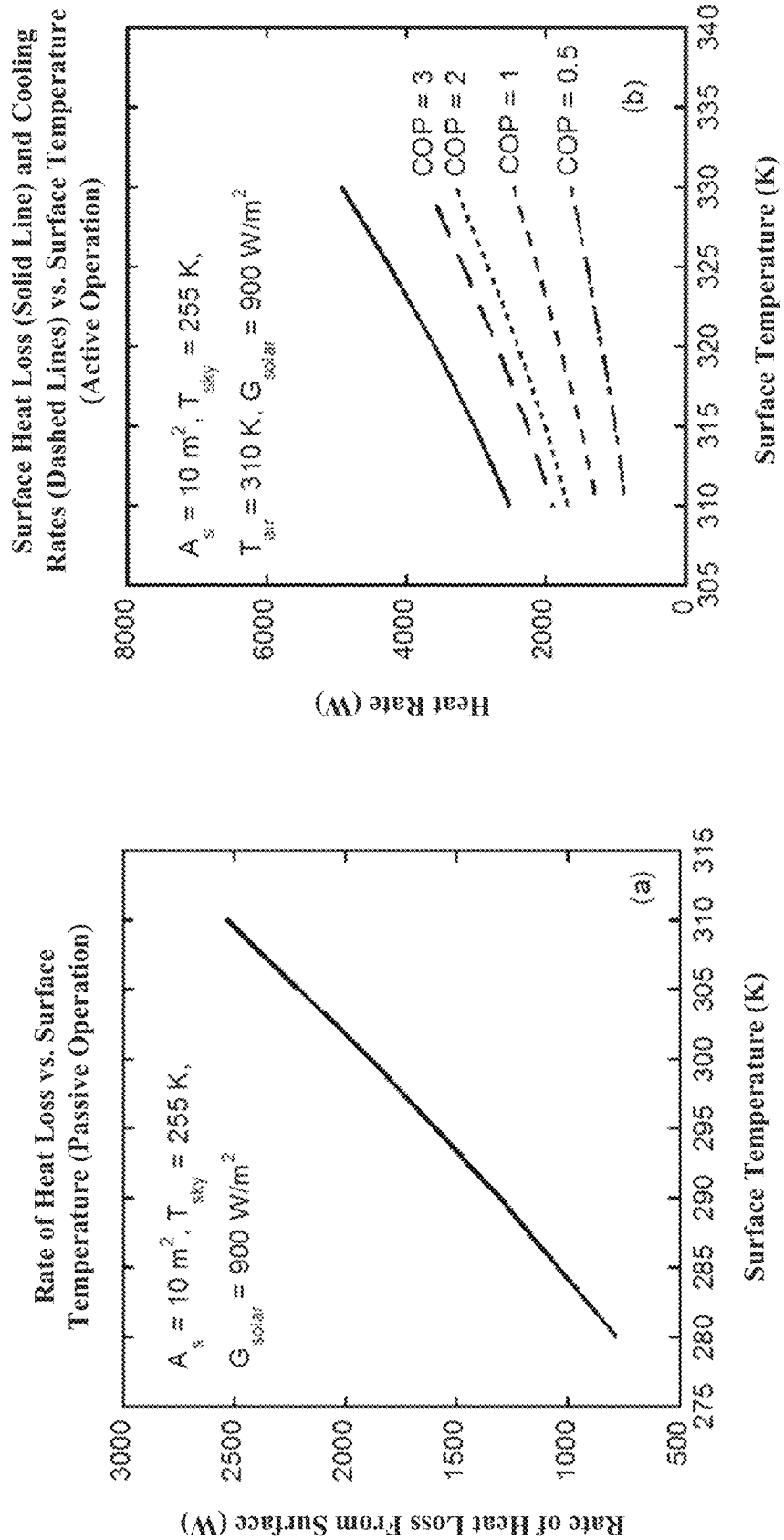
FIG. 2A illustrates example heat losses from a spectrally selective surface during passive cooling operation.
FIG. 2B illustrates example heat losses from a spectrally selective surface during active cooling operation.

FIG. 2A illustrates example heat losses from the spectrally selective surface 110 during passive cooling operation, and. FIG. 2B illustrates example heat losses from the spectrally selective surface 110 during active cooling operation. Particularly, for $A_s$=10 m², $T_{sky}$=255 K, $T_{air}$=310 K, and $G_{solar}$=900 W/m², FIG. 2A shows the rate of heat loss during PDRC versus cooling surface temperature and FIG. 2B shows the rate of heat loss during ADRC as well cooling rates for various coefficients of performance.

Heat losses from the spectrally selective surface 110 during PDRC operation are shown in FIG. 2A. The losses (cooling rates) of the spectrally selective surface 110 decrease as its temperature decreases. For example, at a typical room temperature of $T_c = T_s = 300$ K, the PDRC cooling rate is $q_c$,PDRC=$g_{rad}$=1897 W for the $A_s$=10 m² selective surface. FIG. 2B shows the heat loss, $q_h$, of the spectrally selective surface 110 and ADRC cooling rates, $q_c$, for various surface temperatures and COPs. Temperature differences across air conditioning units ($T_h - T_c$) of 10 to 25° C. (where $T_s = T_h$) are common. At $T_h = T_s$=325 K, for example, the cooling rates are $q_{c,ADRC}$=1421, 2132, 2842, and 3197 W for $A_s$=10m² and for COP=0.5, 1, 2, and 3, respectively. Nonetheless, the cooling rate achieved by the spectrally selective surface 110 is increased by 70% during ADRC with COP=3, relative to the ideal PDRC operation. The cooling rates predicted for the proposed ADRC concept far exceed the actual experimentally measured cooling heat fluxes of 20 W/m² associated with existing PDRC concepts, such as that described in U.S. Pat. Pub. No. 2015/0338175 A1.

Figure 3B:
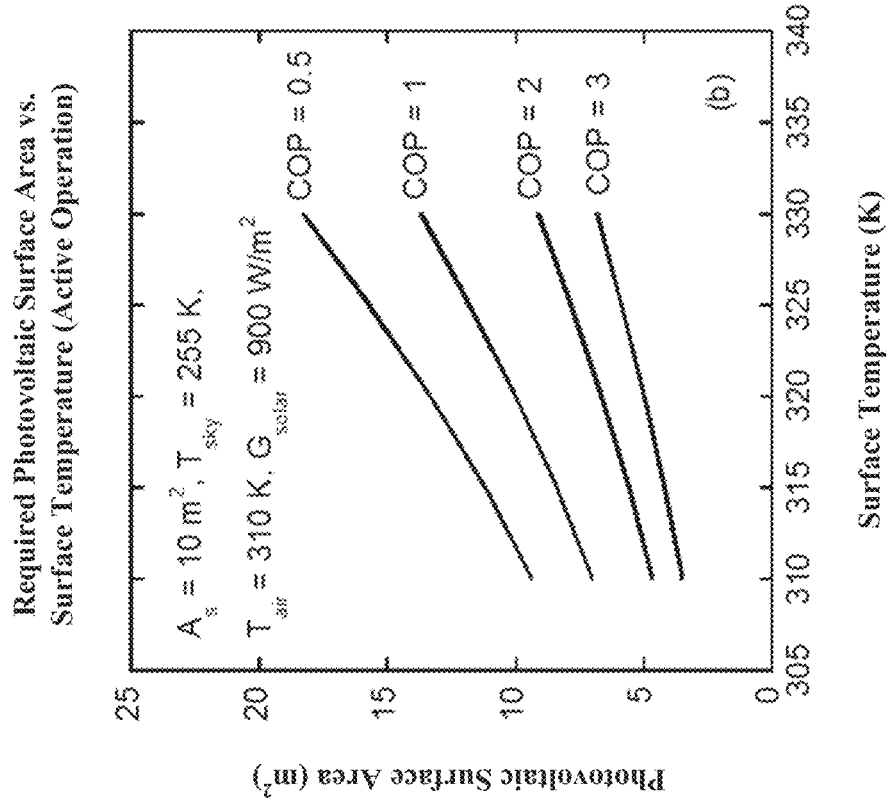
FIG. 3B illustrates example photovoltaic surface areas for active cooling operations.
Figure 3A:
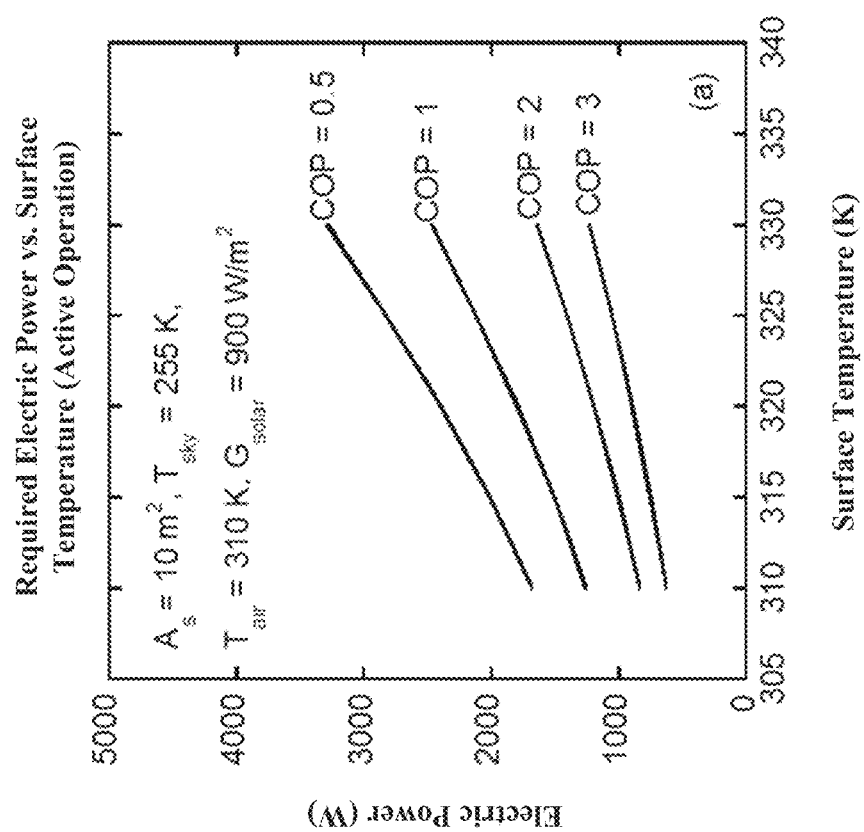
FIG. 3A illustrates an example of power provided to an air conditioning or refrigeration unit for active cooling operations using a spectrally selective surface.
Figure 4:
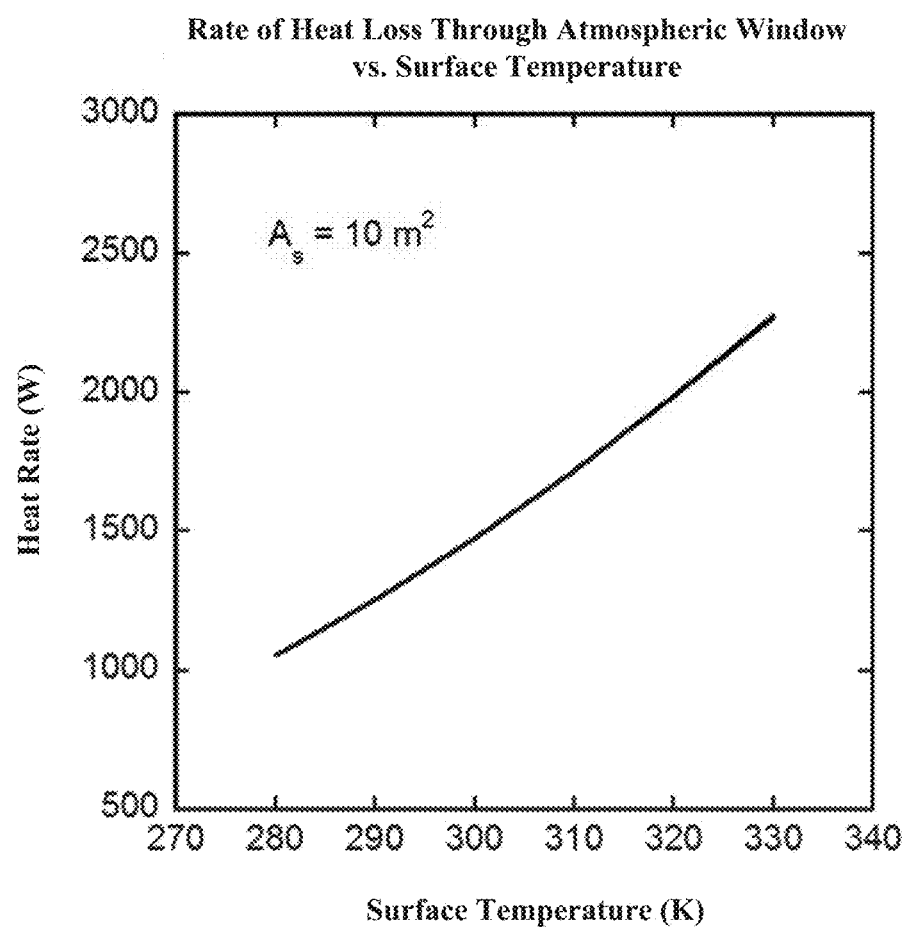
FIG. 4 illustrates an example rate of radiation heat transfer from a spectrally selective surface that travels through the atmospheric window to deep space for $A_s=10 \text{ m}^2$.

FIG. 3A illustrates an example of electric power required by the active cooling system 130 for active cooling operations using the spectrally selective surface 110. For base case ADRC behavior of $A_s$=10 m², $T_{sky}$=255 K, $T_{air}$=310 K, and $G_{solar}$=900 W/m², the required power decreases with increasing COP, and increases as the rate of heat rejection from the spectrally selective surface 110 is increased at higher surface temperatures. At $T_s$=325 K, the required electrical power is $\dot{W}$=2842, 2132, 1421, and 1066 W for $A_s$=10 m² and COP=0.5, 1, 2, and 3, respectively.

As shown schematically in FIG. 1B, the electric power can be delivered to the active cooling system 130 from the photovoltaic panel 140. With $G_{solar}$=900 W/m² for the spectrally selective surface 110, and assuming a photovoltaic conversion efficiency of $\eta_{pv}$=0.20 for the photovoltaic panel 140, the required surface area of the photovoltaic panel 140 can be calculated. The results are shown in FIG. 3B. At $T_s$=325 K, the required area is $A_{pv}$=15.8, 11.8, 7.90 and 5.92 m² for COP=0.5, 1, 2, and 3, respectively.

In addition to accommodating the heat rejection from the active cooling system 130, the spectrally selective surface 110 boosts the cooling of Earth during ADRC operation relative to its use in PDRC to deep space for $A_s$=10 m², as determined by integrating the Planck spectral emissive power distribution over the wavelength range of the atmospheric window:

$$q_{AW} = A_s \int_8^{13\mu m} \frac{C_1}{\lambda^5 [\exp(C_2/\lambda T_s) - 1]} d\lambda, \tag{9}$$

where $C_1 = 3.742 \times 10^8$ W·μm⁴/m² and $C_2 = 1.439 \times 10^4$ μm·K are the first and second radiation coefficients, respectively.

In Eq. (9), irradiation from cold, deep space is assumed to be negligible, as are the effects of absorption and scattering of the upward-propagating radiation within the spectral.nge of the atmospheric windokv. As evident, ADRC ($T_s \geq 310$ K) releases more thermal energy to deep space than PDRC ($T_s \leq 310$ K), demonstrating that ADRC is more effective than PDRC in cooling Earth and potentially reducing global temperatures.

The results above are premised on the assumption that convection heat transfer from the spectrally selective surface 110 occurs exclusively by free convection during ADRC. Assuming an air flow (e.g., wind) parallel to the surface at a speed of $V_{air}$ with turbulent conditions covering the entire surface of the spectrally selective surface 110, the forced convection coefficient may be estimated using:

$$Nu_{L,F} = 0.037 Re_L^{4/5} Pr^{1/3}, \tag{10}$$

and the combined free and forced (mixed) convection heat transfer coefficient may be estima with an expression of the form:

$$Nu_L^{3.5} = Nu_{L,F}^{3.5} + Nu_{L,N}^{3.5}, \tag{11}$$

with air properties again evaluated at T.

Figure 5B:
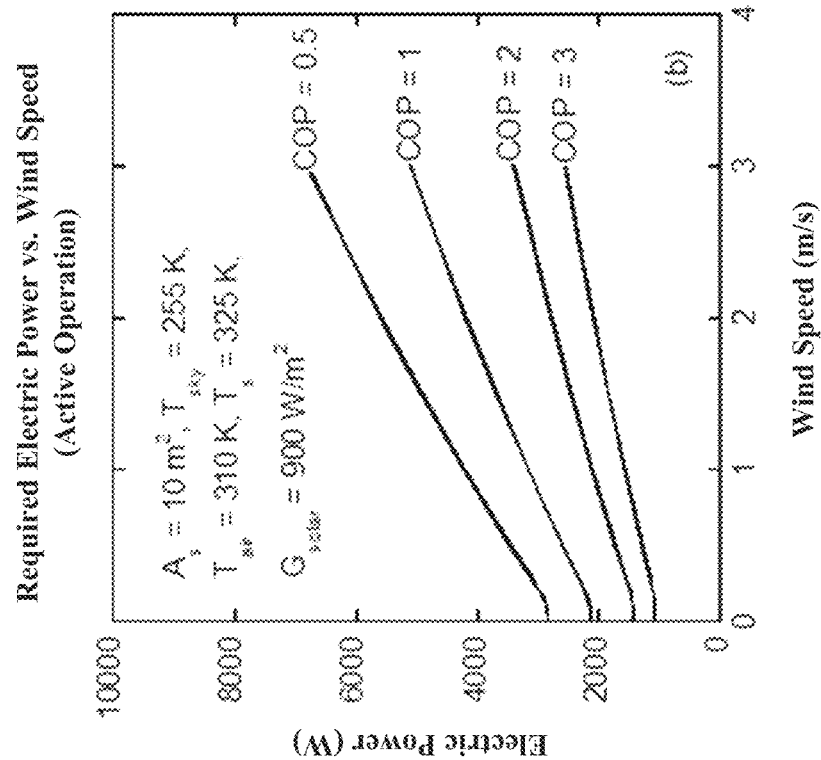
FIG. 5B illustrates power requirements for various coefficients of performance and air velocities.
Figure 5A:
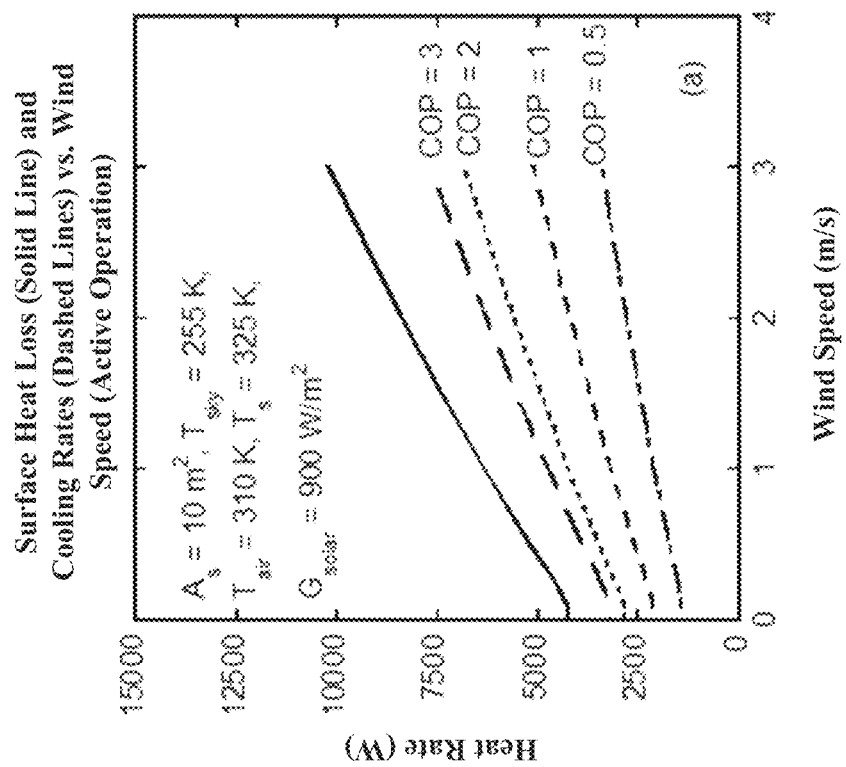
FIG. 5A illustrates the rate of heat loss from the spectrally selective surface as well as cooling rates at various coefficients of performance and air velocities.
Figure 5C:
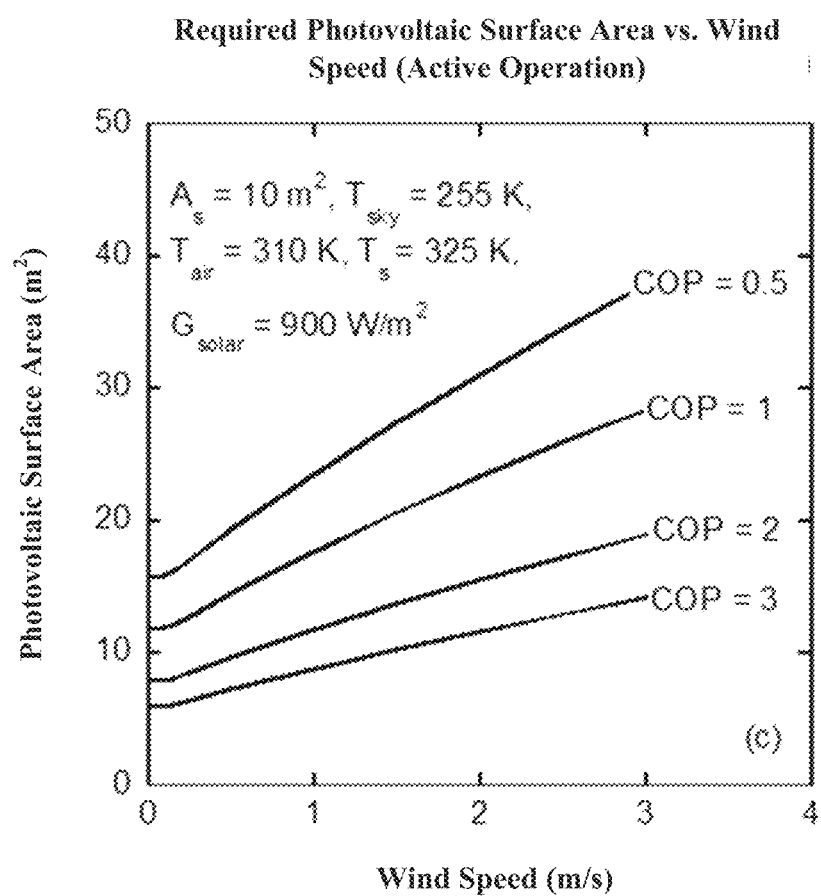
FIG. 5C illustrates photovoltaic surface areas for various coefficients of performance and air velocities.

FIG. 5A illustrates the rate of rejected heat or heat loss from the spectrally selective surface 110, $q_h$, as well as cooling rates, $q_c$, for $A_s=10$ m$^2$, $T_{sky}=255$ K, $T_\infty=310$ K, $T_s=325$ K, and $G_{solar}=900$ W/m$^2$ at various COPs and air velocities. The heat transfer rates increase as the convection coefficient increases due to forced convection effects (e.g., h=4.2 W/m$^2$·K and 44 W/m$^2$·K at $V_{air}=0$ and 3 m/s, respectively). Because of the desirable increases in cooling rates at higher air velocities, both the power required by the active cooling system 130, as shown in FIG. 5B, and the required surface area of the photovoltaic panel 140, as shown in FIG. 5C, increase with increasing $V_{air}$.

A more relevant comparison, however, is to determine the ADRC surface areas that would be required to achieve the same cooling rate as for the PDRC base case. To this end, Eqs. (1) through (8), (10) and (11) may be solved with $q_c$ADRC=$q_c$PDRC=1897 W. At $V_{air}=2$ m/s and COP=3, for example, the calculation yields $\dot{W}=632$ W, $A_s=2.79$ m$^2$ and $A_{pv}=3.51$ m$^2$. Importantly, the presence of forced convection reduces the total surface area from $A_t=A_s=10$ m$^2$ for the existing PDRC concept to $A_t=A_s+A_{pv}=2.79+3.51=6.30$ m$^2$ for the proposed ADRC concept. At $V_{air}=0$ m/s, the total ADRC surface area required to achieve the PDRC cooling rate is $A_s+A_{pv}=5.93+3.51=9.44$ m$^2$, which is still less than the total area required for PDRC.

Figure 6B:
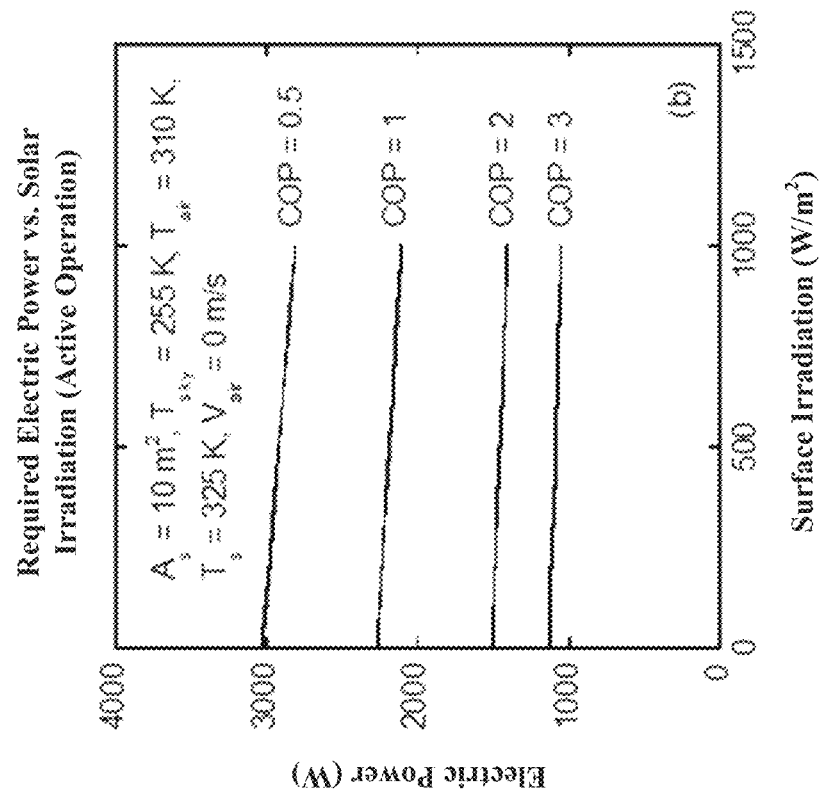
FIG. 6B illustrates power requirements for various coefficients of performance and air velocities.
Figure 6A:
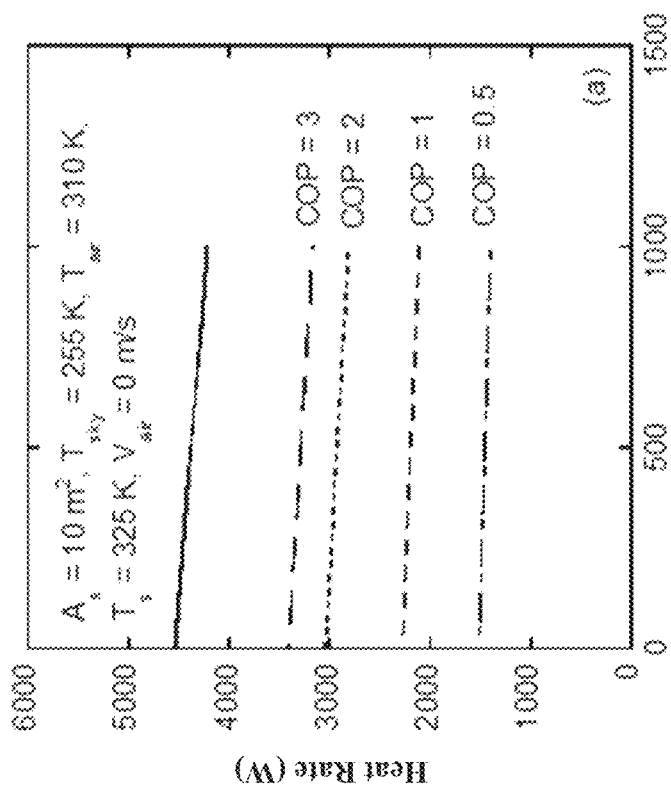
FIG. 6A illustrates active cooling scenario predictions associated with quiescent conditions and various coefficients of performance as well as solar irradiation values.
Figure 6C:
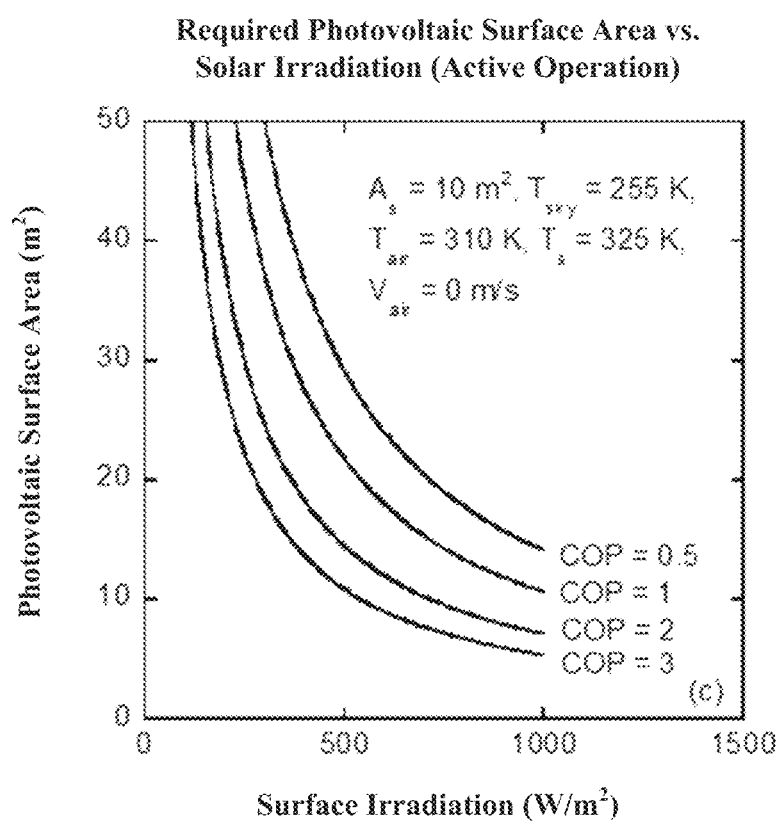
FIG. 6C illustrates photovoltaic surface areas for various coefficients of performance and air velocities.
Figure 7:
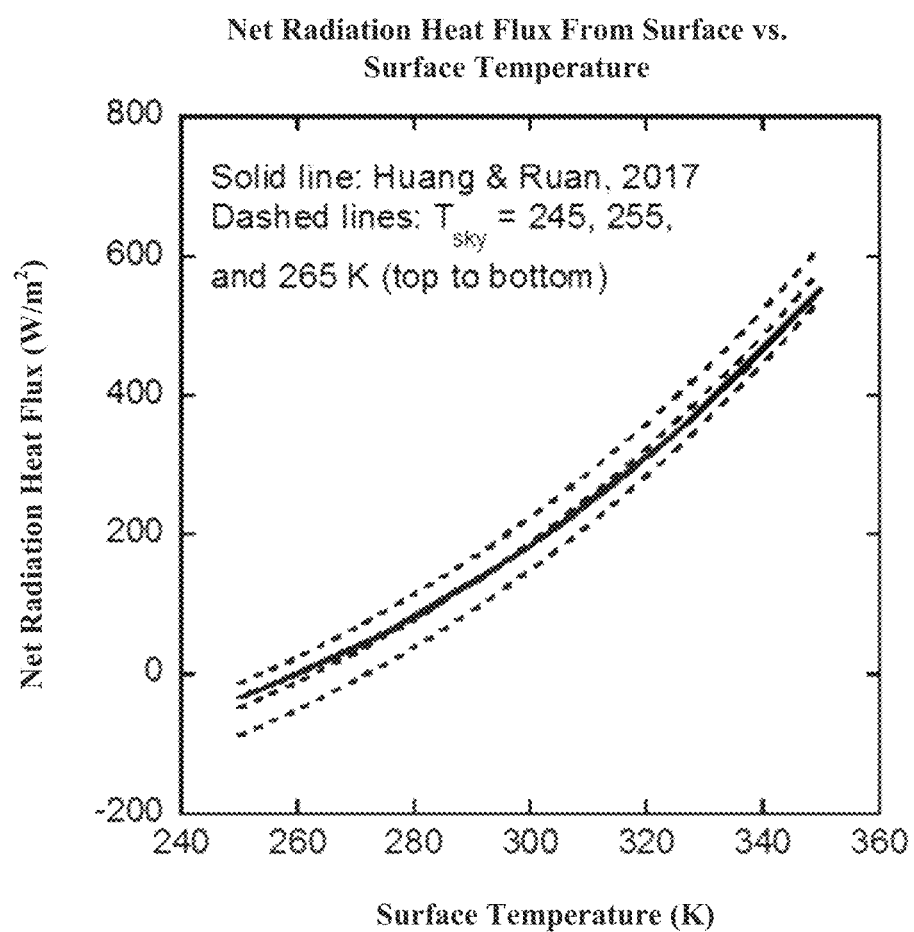
FIG. 7 illustrates a comparison of predicted spectrally selective surface heat fluxes to those of the model described herein for various surface and sky temperatures.

Finally, FIG. 6A illustrates active cooling scenario performance predictions for $A_s=10$ m$^2$, $T_{sky}=255$ K, $T_{air}=310$ K, $T_s=325$ K, and $V_{air}=0$ m/s associated with quiescent conditions and various coefficients of performance as well as solar irradiation values. The predicted values of $q_h$ and $q_c$ are relatively insensitive to $G_{solar}$ as shown in FIG. 6A due to the fact that most of the solar irradiation is reflected from the spectrally selective surface 110. Hence, the power required by the active cooling system 130 is only slightly sensitive to the level of solar .diation, as shown in FIG. 6B. To compensate for low levels of solar irradiation, the surface area required for the photovoltaic panel 140 becomes large, as shown in FIG. 6C, demonstrating the need to power the active cooling system 130 with non-solar sources during periods of low or no solar irradiation. Similar sensitivities of $q_c$, $q_h$, $\dot{W}$ and $A_{pv}$, to $G_{solar}$ are noted for cases involving forced convection.

Thus, a system-level model to predict the cooling performance of spectrally selective surfaces in both passive and active daytime radiative cooling scenarios is described above, During ADRC, spectrally selective surfaces are used in conjunction with established air conditioning and refrigeration hardware. The model predicts that selective surfaces, such as those recently proposed for PDRC, could be more effectively incorporated with established air conditioning and refrigeration technologies operated in ADRC mode. A non-exhaustive list of the potential advantages of ADRC relative to PDRC is as follows:

ADRC matches cooling loads better than PDRC, because PDRC cooling rates deteriorate with decreasing surface temperatures, which are approximately equal to the temperatures of the volume to be cooled.

ADRC can provide higher cooling rates than PDRC for the same cooling surface area. This advantage is more pronounced at higher COPs.

ADRC can require less surface area than PDRC to satisfy a specific cooling load, even when the area occupied by the ADRC photovoltaic panels is taken into account. For roof-mounted refrigeration and air-conditioning hardware, for example, ADRC might be feasible for an existing building when PDRC is not. This advantage is more pronounced at higher COPs, The cooling capacity of PDRC is adversely affected by heat transfer from the warm ambient to the spectrally selective surface, requiring thermal insulation of the surface from heat gains by convection and conduction. In contrast, ADRC cooling rates are improved by heat transfer from the hot spectrally selective surface to the ambient, minimizing or eliminating the need for thermal insulation.

ADRC increases the amount of heat lost from Earth to deep space relative to PDRC, beneficially impacting Earth's energy balance and potentially reducing global temperatures.

ADRC offers the following advantages relative to conventional air conditioning and refrigeration systems that utilize convection to transfer heat from a condenser unit to the outside air.

The ADRC concept relies on radiation as well as free or mixed convection to condense the refrigerant, potentially eliminating the need for fan-cooled condensers, reducing refrigeration and/or air conditioning capital costs and operating costs.

In contrast to heat released from ground-level, fan-cooled condenser units, heat released from roof-mounted spectrally selective surfaces for ADRC is directed upward by radiation, and by convection to ambient above the roof line. Therefore, roof-mounted ADRC spectrally selective surfaces will not raise temperatures of the ambient ground level as much as conventional air conditioning or refrigeration approaches, increasing human comfort outdoors and reducing cooling loads imposed on the infrastructure to be cooled and neighboring infrastructure.

Without the need for fan cooling of a traditional condenser unit, for example, ADRC can provide quiet operation, reducing ambient noise. ADRC utilizing thermoelectric cooling units could have no moving parts or air conditioning fluids and could operate silently.

ADRC increases the amount of heat transferred from Earth to deep space relative to conventional cooling strategies, beneficially impacting Earth's energy balance.

The model described above uses energy balances and heat transfer rate equations to provide initial predictions for ARRC concepts. More detailed modeling could be relied upon to further optimize ADRC for specific applications. More sophisticated descriptions of both the radiation and convection heat transfer could be relied upon to predict the performance of ADRC for a broad range of microclimates and operating conditions.

Figure 8:
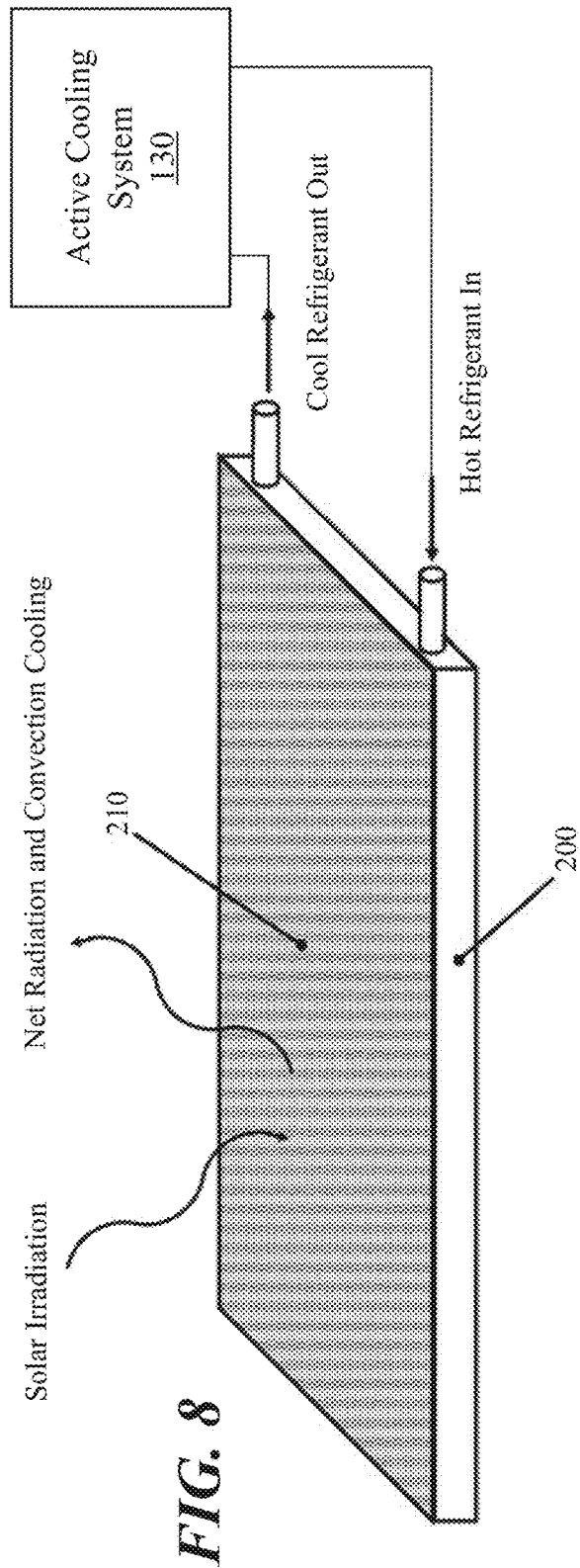
FIG. 8 illustrates an example heat exchanger with a spectrally selective surface for use with vapor compression refrigeration or air-conditioning units according to various embodiments described herein.

Based on the results demonstrated above, spectrally selective surfaces could be integrated with heat exchangers or heat sinks to achieve the potential advantages of ADRC. FIG. 8 illustrates an example heat exchanger 200 for use with an active cooling system, such as the active cooling system 130, which may include a vapor compression air conditioning unit, refrigeration unit, or similar unit. The heat exchanger 200 includes a spectrally selective surface material 210 formed or placed on at least one surface of the heat exchanger 200. In the example shown in FIG. 8, the spectrally selective surface material 210 is on the top of the heat exchanger 200. The top of the heat exchanger 200 is shown to be flat in FIG. 8, but could include cooling fins, for example, or other structural features. Thermal insulation of the heat exchanger 200 and the selective surface material 210 from convective heat exchange with the outdoor ambient is neither necessary nor desirable in certain use cases, such as when the temperature of the heat exchanger 200 and the selective surface material 210 exceed that of the outdoor ambient.

The spectrally selective surface material 210 can be embodied as a material having high reflectivity at short wavelengths and high emissivity at long wavelengths. As one example, the spectrally selective surface material 210 can be embodied as a spectrally selective film, such as that reported by Zhai et al. (Y. Zhai, Y. Ma, S. N. David, D. Zhao, R. Lou, G. Tan, R. Yang, X, Yin, "Scalable-manufactured randomized glass-polymer hybrid metamaterial for daytime radiative cooling," Science, vol. 355, pp. 1062-1066, 2017), among others. The spectrally selective surface material 210 can be adhered to the top surface of the heat exchanger 200.

Alternatively, the top surface of the heat exchanger 200 could be made spectrally selective by other means, such as that reported by Raman et al. (A. P. Raman, S. Fan. E. Rephaeli, Structures for Radiative Cooling, U.S. Pat. No. 9,709,349 B2, 2017) or (J. Mandal, Y. Fu, A. Overig, M. Jia, K. Sun, N. Shi, H. Zhou, X. Xiao, N. Yu, Y. Yang, "Hierachically porous polymer coatings for highly efficient passive daytime radiative cooling," Science, 10.1126/science.aat9513, 2018).

In use, hot refrigerant from the active cooling system 130 enters the heat exchanger 200, is cooled and possibly condensed within the heat exchanger 200, and returns to the active cooling system 130 as cool refrigerant. The interior of the heat exchanger 200 can include one or more channels or other structures, such as a bank of internal tubes, to properly distribute the flow of the refrigerant within the heat exchanger 200. The heat exchanger 200 can be formed, in part, from suitable conducting material(s), such as copper, aluminum, or other metals or metal alloys.

It can be desirable but is not required that the heat exchanger 200 be installed so as to expose the spectrally selective surface 210 to the cold temperatures of deep space, such as on the roof of a building or vehicle. The active cooling system 130 can be powered by any power source, including electric utility grids, photovoltaic panels, or other power sources as described in the various embodiments presented below. If photovoltaic sources are used, the heat exchanger 200 could be placed in the vicinity of or adjacent to the photovoltaic panels to form an integrated unit.

Figure 9:
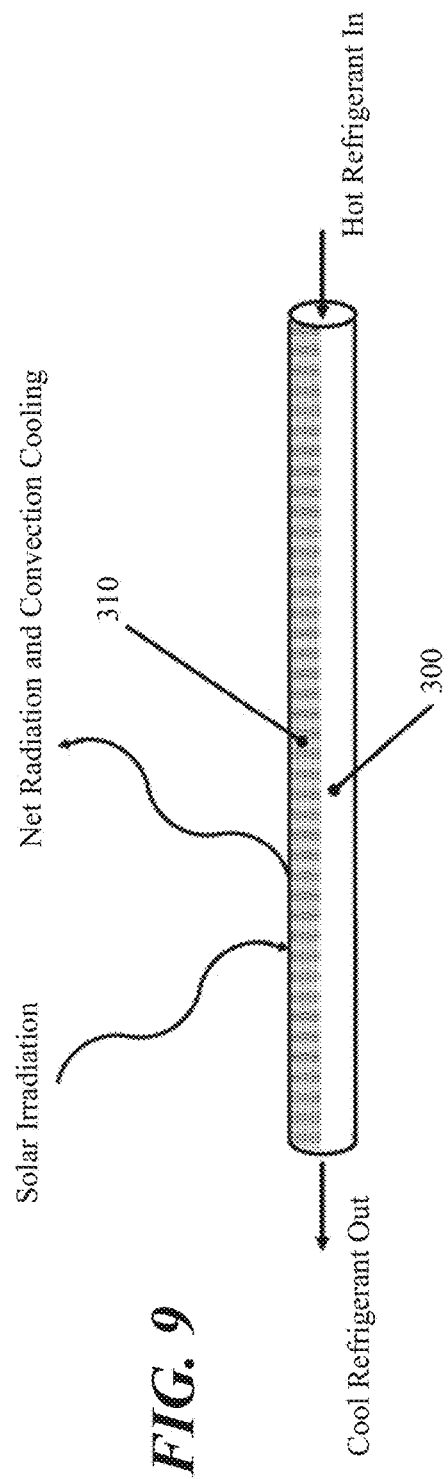
FIG. 9 illustrates another example heat exchanger with a spectrally selective surface for use with vapor compression refrigeration or air conditioning units according to various embodiments described herein.

FIG. 9 illustrates another example heat exchanger 300 with a spectrally selective surface material 310. The heat exchanger 300 can be used with the active cooling system 130. The spectrally selective surface material 310 exhibits high reflectivity at short wavelengths and high emissivity at long wavelengths, similar to the spectrally selective surface 210 shown in FIG. 8.

In FIG. 9, the heat exchanger 300 is embodied as a tube, and the upper, exterior portion of the tube includes the spectrally selective surface material 310. In various cases, the tube of the heat exchanger 300 could be straight, coiled, connected in parallel with other tubes to form a bank of tubes, be equipped with fins, or take other configurations. Similar to the heat exchanger 200 shown in FIG. 8, it is desirable but not required that the heat exchanger 300 be installed so as to expose the spectrally selective surface material 310 to the cold temperatures of deep space. As in FIG. 8, the refrigerant condenses as it flows within the heat exchanger 300. Because the temperature of the heat exchanger 300 and the spectrally selective surface material 310 exceed that of the outdoor ambient, thermal insulation from convective heat exchange with the outdoor ambient is neither necessary nor desirable.

Figure 10:
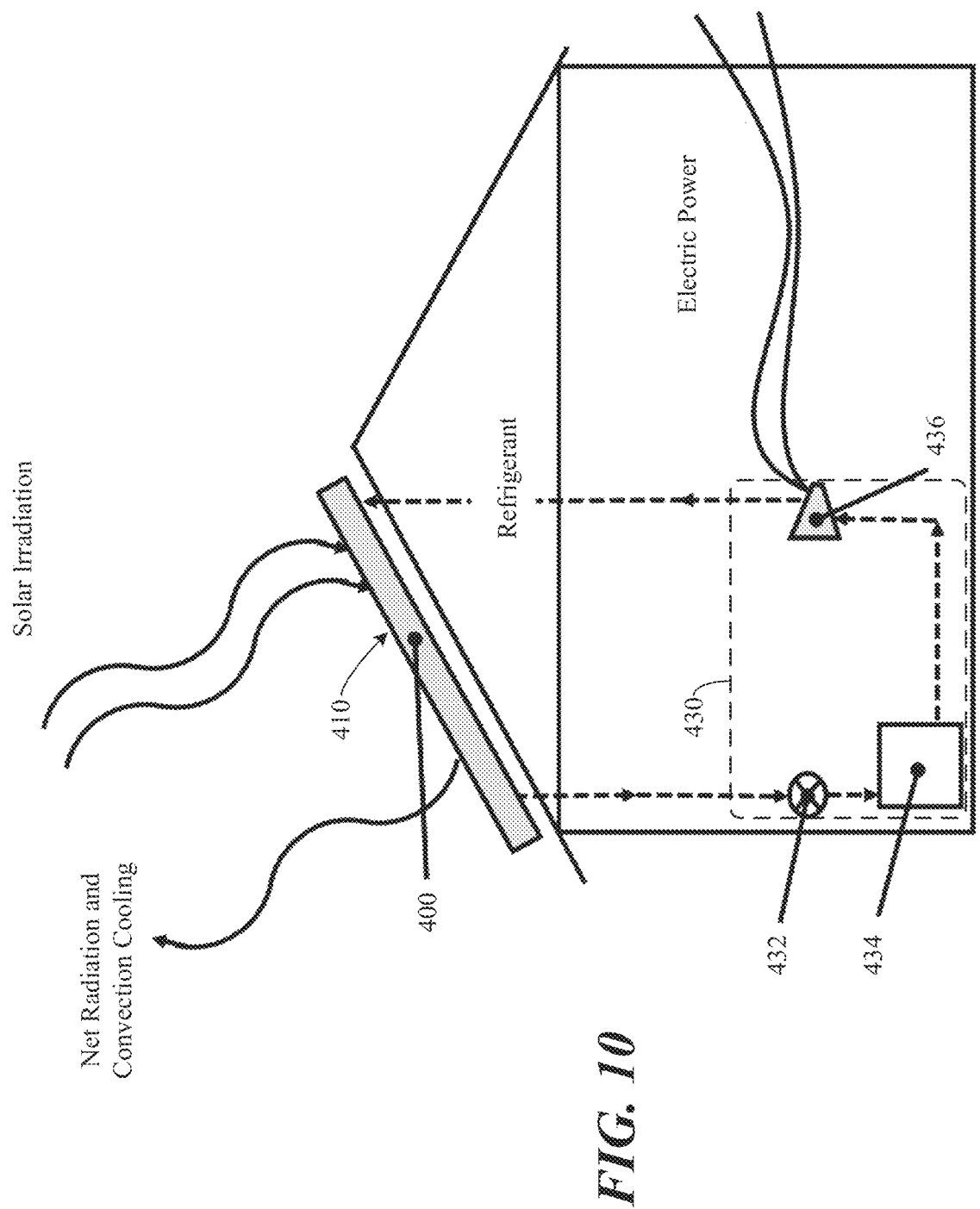
FIG. 10 illustrates another example heat exchanger with a spectrally selective surface integrated with a vapor compression air-conditioning or refrigeration system according to various embodiments described herein.

FIG. 10 illustrates an example heat exchanger 400 that includes a spectrally selective surface material 410 on at least one surface. The heatexchanger 400 is integrated with a vapor compression air-conditioning system 430 that circulates a refrigerant to the heat exchanger 400. The vapor compression air-conditioning system 430 is one example of an active cooling system and includes a throttling device 432, an evaporator 434 which transfers thermal energy from the air-conditioned space to the refrigerant, and an electric powered compressor 436. The concepts described herein are not limited to the vapor compression air-conditioning system 430 shown in FIG. 10, as other active cooling system can be used.

It is desirable, but not required, that the spectrally selective surface material 410 of heat exchanger 400 be exposed to the cold temperatures of deep space he. not placed in the shade during the day). Because the temperatures of the heat exchanger 400 and the spectrally selective surface material 410 exceed that of the ambient outdoor temperature, heat is lost from the heat exchanger 400 by both radiation and convection. Therefore, thermal insulation to guard against convective exchange between the heat exchanger and the ambient is neither necessary nor desirable. The top surface of the heat exchanger 400, including the selective surface material 410, is shown to be flat in FIG. 10, but could also be equipped with cooling fins or other structures. As in FIG. 8 and FIG. 9, the spectrally selective surface material 410 could be a film or other coating that is applied to the top of the heat exchanger 400.

In the example of FIG. 10, electric power is delivered to the vapor compression air-conditioning system 430 from an external power source. Thus, the concept shown in FIG. 10 would require access to electric power.

Figure 11:
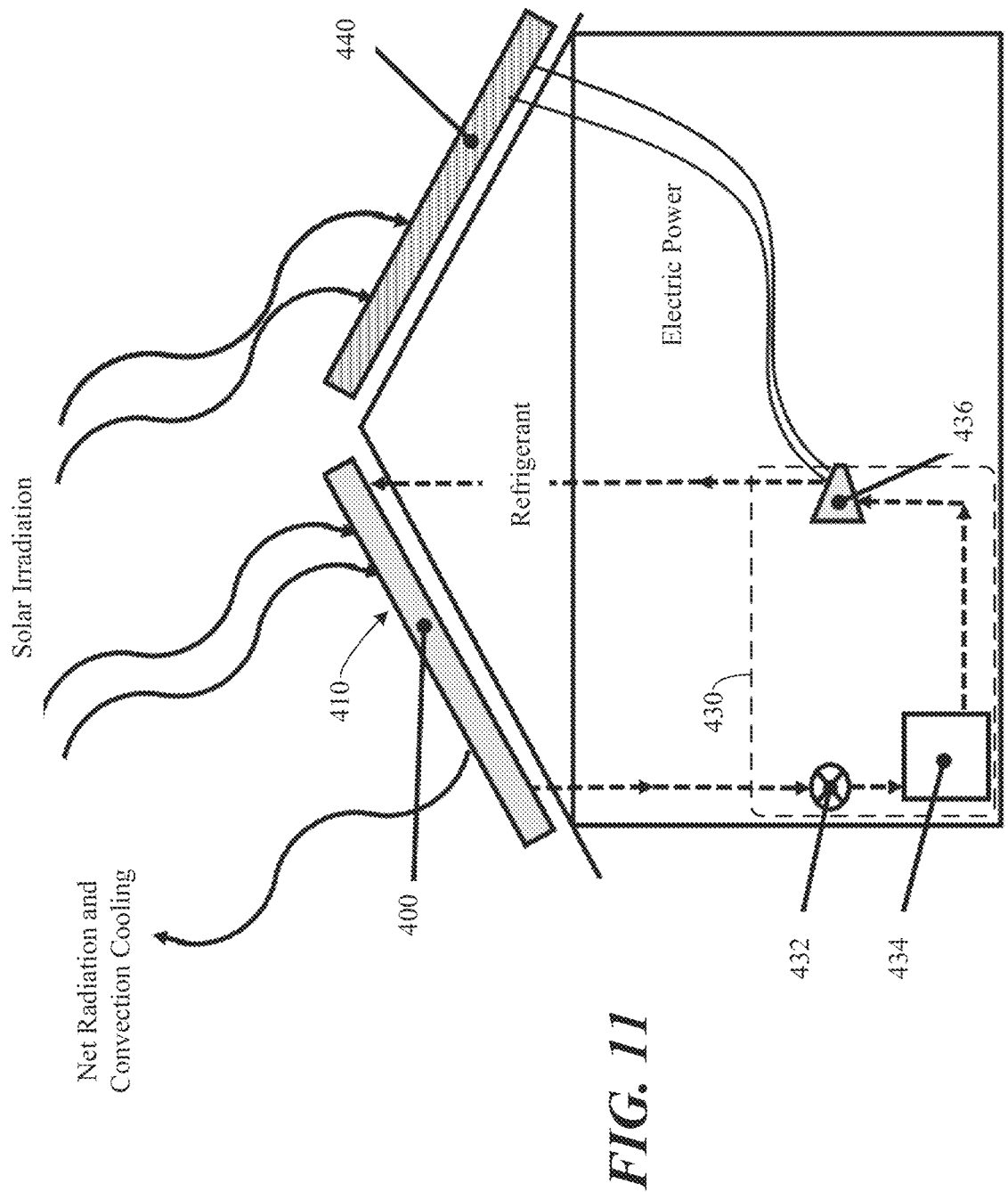
FIG. 11 illustrates another example heat exchanger with a spectrally selective surface integrated with a vapor compression air-conditioning or refrigeration system and photovoltaic panels according to various embodiments described herein.

FIG. 11 illustrates another example of the heat exchanger 400 integrated with the vapor compression air-conditioning system 430 and one or more photovoltaic or solar panels 440. In the concept shown in FIG. 11, the photovoltaic panels 440 supply electric power to vapor compression air-conditioning system 430, reducing or eliminating the need for access to another source of electric power. The concept shown in FIG. 11 could be self-powered and used in remote areas where a local electric power supply is not available.

FIG. 12 illustrates an example system 500 with heat exchanger 510 having a spectrally selective surface 512 integrated with thermoelectric modules 520 according to various embodiments described herein. The top surface of the heat exchanger 510, including the spectrally selective surface 512, is shown to be flat in FIG. 12, but could also be equipped with cooling fins or other structures. As in FIGS. 8 and 9, the temperatures of the heat exchanger 510 and the spectrallyselective surface 512 exceed that of the outdoor ambient. Therefore, thermal insulation against convective exchange between the heat exchanger 510 and the ambient is neither necessary nor desirable.

As in FIGS. 8 and 9, the spectrally selective surface 512. in FIG. 12 could be a film that is applied to the top of the heat exchanger 510. Alternatively, the top surface of the heat exchanger 510 could be made spectrally selective by other means. The hot sides of the thermoelectric modules 52.0 are in contact with the base of the heat exchanger 510. The cold sides of the thermoelectric modules 520 are in contact with the volume to be cooled or refrigerated. The cold sides of the thermoelectric modules 520 could also be finned, or otherwise enhanced to promote effective heat transfer. In the example shown in FIG. 12, electric power is delivered to the thermoelectric modules 520 from an external power source. It is desirable but not required that the top surface of the heat exchanger 510 be exposed to the cold temperatures of deep space. The concept shown in FIG. 12 involves no moving parts, could be portable or stationary, but would require access to electric power.

FIG. 13 illustrates another example heat exchanger or heat sink 510 with a spectrally selective surface 512 integrated with thermoelectric modules 520. FIG. 13 shows the thermoelectric cooling concept of FIG. 10 integrated with a photovoltaic panel or panels 540 that supply electric power to the thermoelectric modules 520. The concept shown in FIG. 13 would require no moving parts, could be portable or stationary, and could be used in remote areas where a local power source is not available. The concept would also generate little or no noise during operation. As in FIG. 12, the heat exchanger and selective surface temperatures exceed that of the outdoor ambient. Therefore, thermal insulation to guard against convective exchange between the heat exchanger and the ambient is neither necessary nor desirable.

In summary, a number of different designs for active daytime radiative cooling for refrigeration and air conditioning systems are presented. The designs include hot (relative to the outdoor ambient), spectrally selective surfaces that (i) reject heat from refrigeration or air conditioning systems, (ii) exhibit high reflectivity at short wavelengths (including the solar spectrum) and high emissivity at long wavelengths associated with terrestrial radiation emitted from the hot surface, and (iii) lose thermal energy by convection in addition to radiation. Beneficial heat loss may also occur by conduction through structural supports to infrastructure including but not limited to the roofs of buildings.

The above-described examples of the present disclosure are merely possible examples of various embodiments to set forth a clear understanding of the principles of the disclosure. Many variations and modifications can be made without departing substantially from the spirit and principles of the disclosure. All such modifications and variations are intended to be included herein within the scope of this disclosure and protected by the following claims.

Therefore, the following is claimed:

1. A heat exchanger system, comprising:
a heat exchanger for active convective cooling at a temperature that exceeds that of outdoor ambient;
a spectrally selective surface material on at least one surface of the heat exchanger for radiative cooling at a temperature of the heat exchanger that exceeds that of outdoor ambient, wherein the spectrally selective surface material exhibits high reflectivity at shorter wavelengths and high emissivity at longer wavelengths; and
an active cooling system to actively transfer heat from a space to be air conditioned or refrigerated to the heat exchanger.

2. The heat exchanger system according to claim 1, wherein the heat exchanger is installed at a location to expose the spectrally selective surface material on the at least one surface of the heat exchanger to solar irradiation and temperatures of deep space.

3. The heat exchanger system according to claim 1, wherein hot refrigerant from the active cooling system is at least one of cooled or condensed within the heat exchanger.

4. The heat exchanger system according to claim 1, wherein the heat exchanger comprises a heat sink.

5. The heat exchanger system according to claim 1, wherein the heat exchanger comprises a bank of tubes.

6. The heat exchanger system according to claim 1, wherein the heat exchanger comprises a tube.

7. The heat exchanger system according to claim 1, further comprising a photovoltaic panel to provide power to the active cooling system.

8. The heat exchanger system according to claim 1, wherein the active cooling system comprises a vapor compression or other thermodynamic air conditioning or refrigeration unit.

9. The heat exchanger system according to claim 1, wherein:
the active cooling system comprises a thermoelectric module; and
a hot side of the thermoelectric module is positioned to contact the heat exchanger.

10. A heat exchanger system, comprising:
a heat exchanger for active convective cooling at a temperature that exceeds that of outdoor ambient; and
a spectrally selective surface material on at least one surface of the heat exchanger for radiative cooling at a temperature of the heat exchanger that exceeds that of outdoor ambient, wherein the spectrally selective surface material exhibits high reflectivity at shorter wavelengths and high emissivity at longer wavelengths.

11. The heat exchanger system according to claim 10, wherein the heat exchanger is installed at a location to expose the spectrally selective surface material on the at least one surface of the heat exchanger to solar irradiation and temperatures of deep space.

12. The heat exchanger system according to claim 10, wherein the heat exchanger comprises at least one of a heat sink or a tube.

13. The heat exchanger system according to claim 10, further comprising an active cooling system to actively transfer heat from a space to be air conditioned or refrigerated to the heat exchanger.

14. The heat exchanger system according to claim 13, wherein hot refrigerant from the active cooling system is at least one of cooled or condensed within the heat exchanger.

15. The heat exchanger system according to claim 13, further comprising a photovoltaic panel to provide power to the active cooling system.

16. The heat exchanger system according to claim 13, wherein the active cooling system comprises an air conditioning or refrigeration unit.

17. The heat exchanger system according to claim 13, wherein:
the active cooling system comprises a thermoelectric module; and
a hot side of the thermoelectric module is positioned to contact the heat exchanger.

18. A heat exchanger system that operates at a temperature that exceeds that of outdoor ambient for active radiative and convective cooling, comprising:
a heat exchanger;
a spectrally selective surface material on at least one surface of the heat exchanger, wherein the spectrally selective surface material exhibits high reflectivity at shorter wavelengths and high emissivity at longer wavelengths; and
a thermoelectric module, wherein:
a hot side of the thermoelectric module is positioned to heat the heat exchanger; and
a cool side of the thermoelectric module is positioned to cool a volume.

19. The heat exchanger system according to claim 18, wherein the heat exchanger is installed at a location to expose the spectrally selective surface material on the at least one surface of the heat exchanger to solar irradiation and temperatures of deep space.

20. The heat exchanger system according to claim 18, wherein the hot side of the thermoelectric module is positioned to contact the heat exchanger and the cool side of the thermoelectric module is positioned to contact the volume.

\* \* \* \* \*